July 13, 1954 — R. BEALL — 2,683,441
ANIMAL HOLDING CHUTE
Filed Jan. 22, 1951 — 2 Sheets-Sheet 1

Robbie Beall
INVENTOR.

BY *Clarence A. O'Brien and Harvey B. Jacobson*
Attorneys

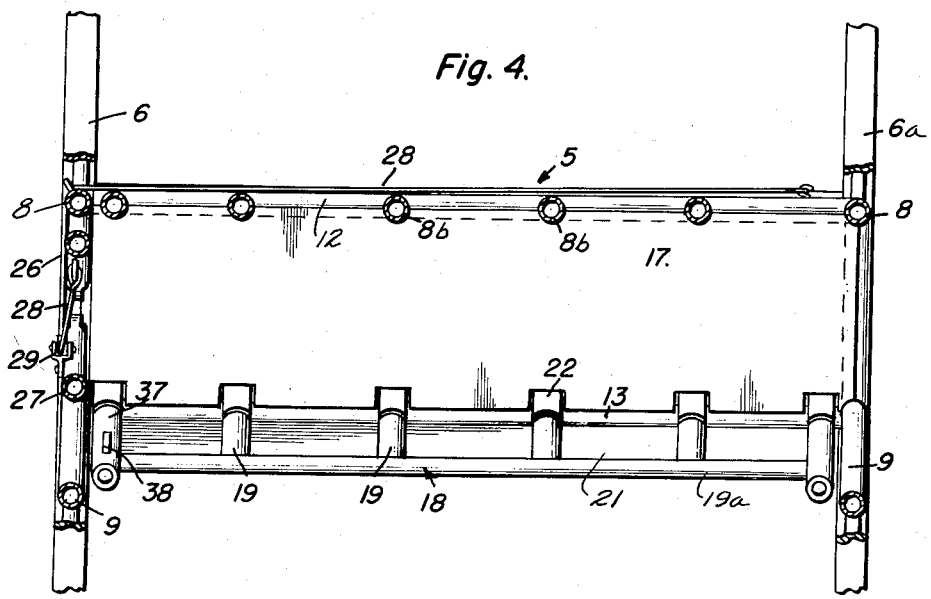
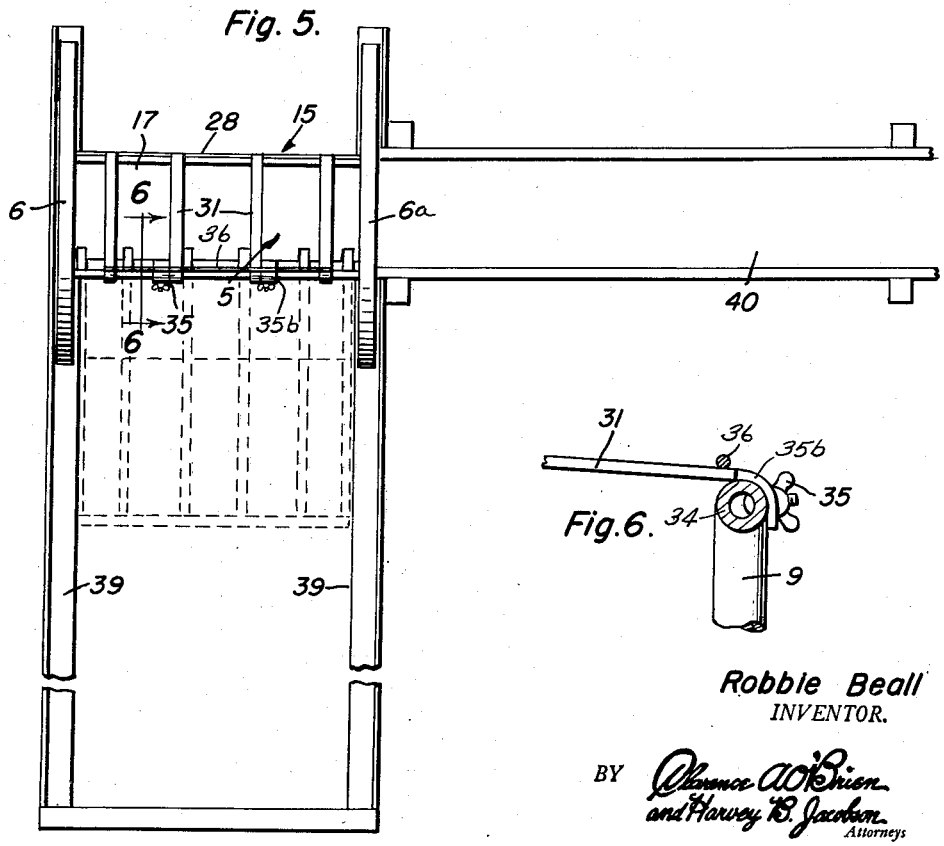
Robbie Beall
INVENTOR.

Patented July 13, 1954

2,683,441

UNITED STATES PATENT OFFICE 2,683,441

ANIMAL HOLDING CHUTE

Robbie Beall, Nacogdoches, Tex.

Application January 22, 1951, Serial No. 207,145

7 Claims. (Cl. 119—103)

The present invention relates to new and useful improvements in chutes for holding calves or other farm animals in a recumbent position to facilitate the treatment or the performance of various veterinarian functions on the animal.

An important object of the invention is to provide a rolling chute or cage into which the animal is driven and providing the chute with restraining means to hold the animal firmly therein while the chute is rolled to place the animal on its side or back.

Another object is to provide a neck restraining or clamping yoke for the animal, as well as a swingable side for the chute to clamp against the sides of the animal to thus prevent movement of the animal while the chute is being rolled, or while the animal is being administered to.

A further object is to provide wheels at each end of the chute for rolling thereon and mounting the wheels to travel on tracks to facilitate its movement.

A still further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 4 is a longitudinal sectional view taken on a line 4—4 of Figure 2;

Figure 5 is a top plan view; and,

Figure 6 is an enlarged fragmentary sectional view taken on a line 6—6 of Figure 5.

Figure 1:
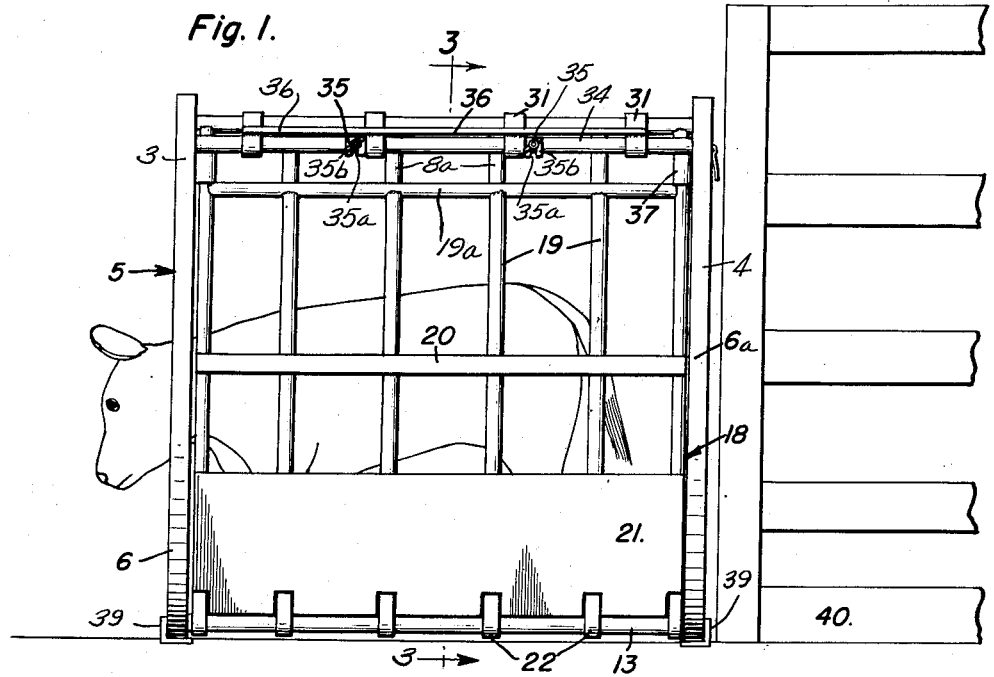
Figure 1 is a side elevational view.
Figure 2:
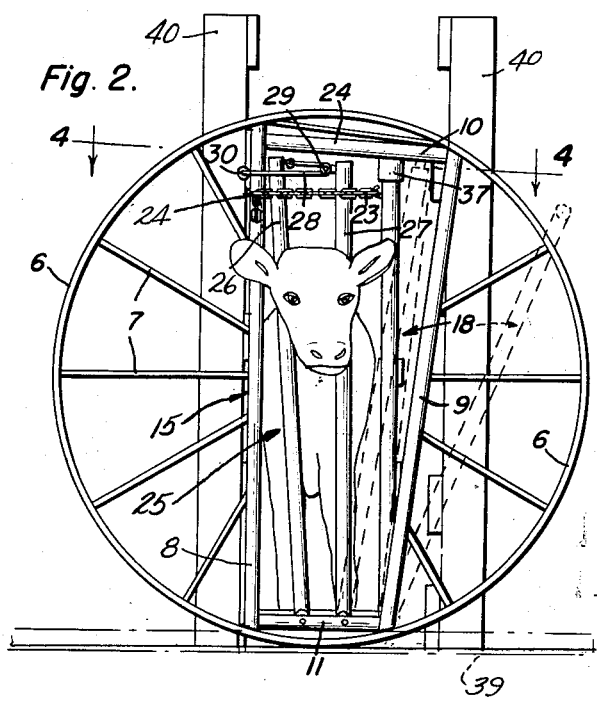
Figure 2 is a front elevational view.
Figure 3:
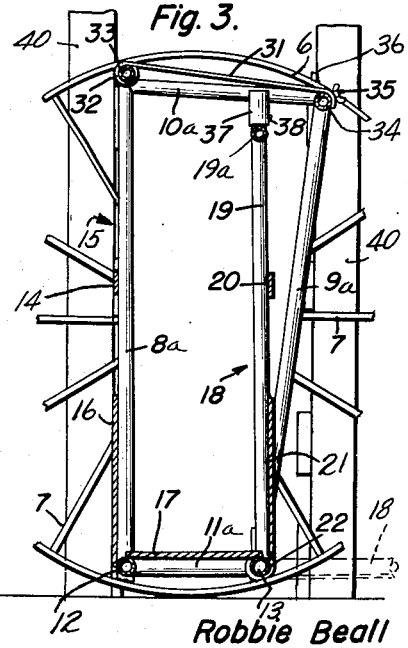
Figure 3 is a transverse sectional view taken on a line 3—3 of Figure 1 with parts omitted.

Referring now to the drawings in detail, wherein for the purpose of illustration, I have disclosed a preferred embodiment of my invention, the numeral 5 designates the chute or cage generally and which comprises a carriage composed of a wheel 6 at the front end 3 of the chute or cage, and a wheel 6a at the rear end 4 of said chute or cage. Each wheel is composed of a rim 7 and spokes 7a and a pair of front vertical bars 8 and 9 are welded or otherwise suitably secured to the rim and spokes of front wheel 6 and a pair of rear vertical bars 8a and 9a are similarly secured to the rim and spokes of rear wheel 6a. Bars 9 and 9a are inclined at their upper ends away from bars 8 and 8a and upper and lower cross bars 10 and 11 are welded to the upper and lower end portions of bars 8 and 9 of front wheel 6 and upper and lower cross bars 10a and 11a are similarly secured to the upper and lower end portions of bars 8a and 9a of rear wheels 6a.

A pair of longitudinal bars or rails 12 and 13 are welded at their ends to the lower portions of the vertical bars 8 and 8a and 9 and 9a respectively of the pair of wheels to rigidly connect the wheels to each other. A horizontal rail 14 is welded at its ends to the vertical bars 8 and 8a of the front and rear wheels to form a stationary side 15 for the chute or cage which is closed at its lower side by a sheet metal panel 16 also welded to the vertical bars 8 and 8a as well as to longitudinal bar 12. The stationary side 15 also includes intermediate vertical bars 8b welded to lower longitudinal bar 12 as well as to rail 14 and panel 16.

A sheet metal platform 17 is welded on top of the longitudinal bars 12 and 13 and lower cross bars 11. A movable side or door 18 is constructed of vertical bars 19, a top horizontal bar 19a, an intermediate horizontal rail 20 and a lower sheet metal panel 21 which is welded to the lower portion of vertical bars 19. The lower ends of the vertical bars 19 are formed with eyes 22 which are pivoted on longitudinal bar 13 for swinging the movable side 18 inwardly and outwardly relative to the stationary side 15. A chain 23 and hook 24 hold the movable side 18 inwardly.

A neck yoke 25 is composed of a pair of vertical bars 26 and 27 which are pivoted at their lower ends to the lower cross bar 11 of the front wheel 6 for lateral swinging movement of the bars 26 and 27 toward and away from each other and a rope or cable 28 is attached at one end to the upper end of bar 26 and extends around a pulley 29 attached to the upper end of bar 27 and then extends toward the stationary side 15 and through eyes 30 at the top of the stationary side toward the rear end of the chute for actuation from a position adjacent thereto.

The top of the chute is closed by spaced apart parallel transverse metal straps 31 which are formed with eyes 32 at one end pivoted on upper longitudinal rail or bar 33 of the stationary side 15 and the other ends of the straps are secured to an upper longitudinal rail or bar 34 at the upper ends of posts 9 by bolts and wing nuts 35 engaged in slots 35a of latch plates 35b welded to one side edge of the straps. The metal straps 31 are connected to each other for uniform swinging movement by a rod 36.

The movable side 18 is provided at the upper ends of the bars 19 with removable telescoping extensions 37 secured thereto by set screws 38 to engage the rail 34 and prevent the side 18 from dropping downwardly, while a calf is entering the chute.

In the operation of the device, the wheels 6 are placed on a pair of angle iron tracks 39 to travel thereon and which are laid to extend outwardly at one side of a cattle runway 40. The chute or cage 5 is wheeled into a position at the delivery end of the runway so that an animal may be driven into the rear end of the chute to stand on platform 17 and rope 28 is then pulled to close yoke 25 on the neck of the animal. Movable side 18 is then swung inwardly and secured by chain 23 to hold the animal tightly against the stationary side 15.

The chute may then be rolled on the tracks 39 to either turn the animal on its side or to turn the animal on its back, according to the nature of the work to be performed on the animal and the animal will thus be securely held while being administered to.

When the chute is turned to place the animal on its back, the straps 31, which form the top of the chute, prevent the animal from falling out of the chute.

When the animal is to be released, the chute is returned to its upright position and neck yoke 25 and movable side 18 are released and the extensions 37 on the movable side removed, whereupon the side 18 may drop downwardly to rest on the ground and permit the animal to leave the chute.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and the scope of the appended claims.

Having described the invention, what is claimed as new is:

1. An animal holding device comprising a revolvable cage adapted for rolling over the ground, a neck yoke at one end of the cage for holding the neck of an animal, and means for holding the animal immovable in the cage for rotation therewith and including at least one movable side for the cage holding the animal against an opposing side of the cage and said movable side being swingable downwardly to rest on the ground to release the animal from the cage while the remainder of the cage remains stationary.

2. An animal holding device comprising a revolvable cage including a pair of wheels at the ends of the cage adapted for rolling the cage over the ground, a stationary side fixed to the rim of the wheels, a movable side pivotally connected at its lower portion to the rims of the wheels for swinging inwardly and outwardly therebetween to clamp an animal between said sides of the cage, a bottom and a top for the cage, means securing the movable side in adjustable animal clamping position, an upper rail fixed to the wheels at the movable side of the cage and under which the movable side is swingable, and a removable stop carried by the movable side and engaging the rail to hold the movable side in a raised position, said movable side being swingable downwardly to rest on the ground to release the animal from the cage while the remainder of the cage remains stationary.

3. An animal holding device comprising a revolvable cage including a pair of wheels at the ends of the cage adapted for rolling the cage over the ground, a stationary side fixed to the wheels, a movable side pivotally supported by the wheels for swinging inwardly and outwardly therebetween to clamp an animal between said sides of the cage, said movable side being swingable downwardly independently of the stationary side and adapted to rest on the ground to release the animal therefrom, a bottom and a top for the cage, means securing the movable side in adjustable animal clamping position and stop means carried by the movable side and engaging a stationary part of the cage to hold the movable side in a raised position.

4. An animal holding device comprising a pair of ground wheels, a cage including upper and lower longitudinal bars fixed to the wheels, vertical bars fixed to one pair of the upper and lower longitudinal bars and closing one side of the cage, the opposite side of the cage being open, a movable side for the cage pivoted at its lower portion to the remaining lower bar for inward and outward raising and lowering swinging movement at the open side of the cage, a floor in the bottom of the cage, a top closing the top of the cage and under which the movable side is swingable, and means holding the movable side inwardly in a raised position.

5. An animal holding device comprising a carriage including a pair of ground wheels, and a cage fixed to and mounted axially of the wheels and adapted for bodily turning movement with the wheels, said cage being closed at one side and open at its opposite side, and a door at the open side of the cage and pivoted at its lower portion to the cage for swinging downwardly to rest on the ground into an open position to release the animal from the cage while the remainder of the cage remains stationary.

6. An animal holding device comprising in combination, a chute, a track at one end of and at right angles to the chute, and a carriage including a pair of wheels mounted to travel on the track, a cage having front and rear end portions fixed to the wheels for turning the cage about its longitudinal axis, said rear end portion being open and adapted to register with the chute to admit an animal from the chute into the cage, an animal head clamp at the front end of the cage to hold the animal therein, and a vertically swingable door at one side of the cage to release the animal therefrom.

7. An animal holding device comprising a pair of spaced apart wheels, a cage having open ends mounted co-axially on the wheels for bodily turning movement by rolling the wheels over the ground, said cage including a pair of upper longitudinal bars fixed to the wheels in spaced parallel relation to each other, a pair of lower longitudinal bars fixed to the wheels in spaced parallel relation to each other, a top for the cage secured to the pair of upper bars, a stationary side for the cage fixed to one lower bar and also fixed to an adjacent upper bar, a movable side for the cage pivoted to the other lower bar and swingable inwardly and outwardly under both the top and the other upper bar toward and away from the stationary side to clamp an animal in the cage, and a bottom for the cage fixed to the pair of lower bars.

References Cited in the file of this patent

UNITED STATES PATENTS

| Number | Name | Date |
|---|---|---|
| 935,965 | Crossley | Oct. 5, 1909 |
| 939,228 | Dobry | Nov. 9, 1909 |
| 1,444,769 | Abernathy | Feb. 13, 1923 |
| 1,487,977 | Ryan | Mar. 25, 1924 |
| 2,458,582 | Flohr, Jr. | Jan. 11, 1949 |
| 2,477,213 | Staggs | July 26, 1949 |
| 2,564,317 | Whitworth | Aug. 14, 1951 |